(12) United States Patent
Ambrose et al.

(10) Patent No.: US 10,688,864 B2
(45) Date of Patent: Jun. 23, 2020

(54) FUEL TANK SAFETY VALVE

(71) Applicant: Eaton Corporation, Cleveland, OH (US)

(72) Inventors: Steven L. Ambrose, Farmington Hills, MI (US); Jeffrey B. Smith, Rochester Hills, MI (US); Raymond Bruce McLauchlan, Macomb, MI (US)

(73) Assignee: Eaton Corporation, Cleveland, OH (US)

(*) Notice: Subject to any disclaimer, the term of this patent is extended or adjusted under 35 U.S.C. 154(b) by 244 days.

(21) Appl. No.: 15/846,412

(22) Filed: Dec. 19, 2017

(65) Prior Publication Data

US 2018/0105034 A1 Apr. 19, 2018

Related U.S. Application Data

(63) Continuation of application No. PCT/US2016/038361, filed on Jun. 20, 2016.

(Continued)

(51) Int. Cl.

| F16K 11/00 | (2006.01) |
|---|---|
| B60K 15/035 | (2006.01) |
| F16K 17/30 | (2006.01) |
| F02M 25/08 | (2006.01) |

(Continued)

(52) U.S. Cl.
CPC .. B60K 15/03519 (2013.01); B60K 15/03504 (2013.01); F02M 25/08 (2013.01);
(Continued)

(58) Field of Classification Search
CPC ........ B60K 15/03504; B60K 15/03519; B60K 15/035; B60K 2015/03566;
(Continued)

(56) References Cited

U.S. PATENT DOCUMENTS 3,746,038 A * 7/1973 Simmons ................ F02C 7/228
137/513.5
5,069,188 A * 12/1991 Cook ................. F02M 25/0836
123/516

(Continued)

FOREIGN PATENT DOCUMENTS

| CN | 201206513 | 3/2009 |
|---|---|---|
| JP | H11180277 A | 7/1999 |
| JP | 2005291241 A | 10/2005 |

OTHER PUBLICATIONS

International Search Report and Written Opinion for International Application No. PCT/US2016/038361 dated Sep. 27, 2016, 14 pages.

*Primary Examiner* — Reinaldo Sanchez-Medina
(74) *Attorney, Agent, or Firm* — RMCK Law Group PLC

(57) ABSTRACT

A fuel tank system constructed in accordance to one example of the present disclosure includes a fuel tank, a purge canister and a valve assembly. The valve assembly can be fluidly coupled between the fuel tank and the purge canister. The valve assembly can include a main valve and a safety check valve. The main valve can have a main valve first port fluidly coupled to an outlet of the fuel tank and a main valve second port fluidly connected to the purge canister. The safety check valve can be configured to move from an open position to a closed position upon a pressure drop at the fuel tank outlet exceeding a predetermined threshold. The safety check valve can have a safety check valve first port fluidly coupled to the outlet of the fuel tank and a safety check valve second port fluidly coupled to the purge canister.

24 Claims, 4 Drawing Sheets

Related U.S. Application Data

(60) Provisional application No. 62/182,164, filed on Jun. 19, 2015, provisional application No. 62/191,303, filed on Jul. 10, 2015.

(51) Int. Cl.
  *F16K 15/04* (2006.01)
  *F16K 39/02* (2006.01)

(52) U.S. Cl.
  CPC ........... *F02M 25/089* (2013.01); *F16K 15/04* (2013.01); *F16K 15/042* (2013.01); *F16K 17/30* (2013.01); *F16K 39/024* (2013.01); *B60K 2015/03514* (2013.01); *B60K 2015/03576* (2013.01); *B60K 2015/03585* (2013.01); *B60Y 2400/4045* (2013.01)

(58) Field of Classification Search
  CPC ........... B60K 2015/03514; B60K 2015/03585; F16K 15/042; F16K 15/044; F16K 17/0406; F16K 17/30; F02M 25/08; F02M 25/0836; F02M 2025/0845
  See application file for complete search history.

(56) References Cited

U.S. PATENT DOCUMENTS

| | | | | |
|---|---|---|---|---|
| 5,115,785 | A | * | 5/1992 | Cook ................. F02M 25/0836 123/516 |
| 5,123,459 | A | | 6/1992 | Toshihiro |
| 5,280,775 | A | * | 1/1994 | Tanamura ........ B60K 15/03519 123/518 |
| 5,941,218 | A | * | 8/1999 | DeLand ............. F02M 25/0836 123/520 |
| 2005/0217734 | A1 | * | 10/2005 | Takakura ................ F16K 24/04 137/587 |
| 2011/0240145 | A1 | | 10/2011 | Pifer |
| 2015/0144819 | A1 | * | 5/2015 | Pifer .................... F16K 39/024 251/129.15 |
| 2015/0226348 | A1 | * | 8/2015 | Onodera ............... F16K 39/024 251/129.01 |
| 2016/0176285 | A1 | * | 6/2016 | Walter ................. B60K 15/035 137/517 |
| 2016/0177884 | A1 | * | 6/2016 | Shimokawa ....... F02M 25/0836 123/519 |
| 2017/0036531 | A1 | * | 2/2017 | McLauchlan .... B60K 15/03504 |

* cited by examiner

FUEL TANK SAFETY VALVE

CROSS-REFERENCE TO RELATED APPLICATIONS

This application is a continuation of International Application No. PCT/US2016/038361 filed Jun. 20, 2016, which claims the benefit of U.S. Patent Application No. 62/182,164 filed on Jun. 19, 2015 and U.S. Patent Application No. 62/191,303 filed on Jul. 10, 2015. The disclosures of the above applications are incorporated herein by reference.

FIELD

The present disclosure relates generally to fuel tanks on passenger vehicles and more particularly to a fuel tank valve configuration having a main valve and a safety valve.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fuel tank system constructed in accordance to one example of the present disclosure includes a fuel tank, a purge canister and a valve assembly. The fuel tank has a fuel tank outlet. The valve assembly can be fluidly coupled between the fuel tank and the purge canister. The valve assembly can include a main valve and a safety check valve. The main valve can be configured to move from a closed position to an open position. The main valve can have a main valve first port fluidly coupled to the outlet of the fuel tank and a main valve second port fluidly connected to the purge canister. The safety check valve can be configured to move from an open position to a closed position upon a pressure drop at the fuel tank outlet exceeding a predetermined threshold. The safety check valve can have a safety check valve first port fluidly coupled to the outlet of the fuel tank and a safety check valve second port fluidly coupled to the purge canister.

According to additional features, the main valve second port and the safety valve second port collectively comprise a valve assembly outlet that is fluidly connected to the purge canister. The safety check valve can further include a check valve body, a check ball assembly and a check valve biasing member. The check valve body can include the check valve first port, the check valve second port and a check valve seat. The check valve biasing member can normally urge the check ball assembly away from the check valve seat. When a predetermined threshold pressure is experienced into the safety valve first port, the check ball assembly is urged toward the check valve seat against the bias of the check valve biasing member. The check ball assembly can comprise a first check ball and a second check ball. The first and second check balls can be formed of one of (i) plastic and (ii) synthetic rubber and fluoropolymer.

According to other features, the main valve can be configured to move from a closed position to an open position during a two-stage operation. The main valve further comprises a solenoid, an armature and a poppet. The armature can be associated with the solenoid and be configured to energize and translate the armature in a direction along its longitudinal axis. The poppet can have an opening. The poppet can be retained at a distal end portion of the armature. The poppet can be retained at the distal end portion of the armature by a retaining ring. An annular space can be defined between the distal end portion of the armature and the opening. The pressure can escape through the opening during a first stage of the two-stage operation. A first o-ring can be positioned between the poppet and the valve body on a valve seat at the main valve second port. The poppet can be configured to be held down against the first o-ring and the valve seat from pressure in the fuel tank.

According to other features, a second o-ring can be disposed around the distal end of the armature and configured to selectively move against the poppet and close the annular space when the solenoid is de-energized. The second o-ring can be configured to move away from the poppet when the solenoid is energized during the first stage of the two-stage operation. The armature can pull the poppet off of the seat during a second stage of the two-stage operation when a threshold amount of pressure drop has occurred through the annular space during the first stage.

A fuel tank system constructed in accordance to another example of the present disclosure can include a fuel tank, a purge canister and a valve assembly. The fuel tank can have a fuel tank outlet. The valve assembly can be fluidly coupled between the fuel tank and the purge canister. The valve assembly can include a main valve and a safety check valve. The main valve can be configured to move from a closed position to an open position during a two-stage operation. The main valve can have a main valve first port fluidly coupled to an outlet of the fuel tank and a main valve second port fluidly connected to the purge canister. The safety check valve can be configured to move from an open position to a closed position upon a pressure drop at the fuel tank outlet exceeding a predetermined threshold. The safety check valve can have a safety check valve first port, a safety check valve second port, a check ball assembly and a check valve biasing member. The safety check valve first port can be fluidly coupled to the outlet of the fuel tank. The safety check valve second port can be fluidly coupled to the purge canister. The check valve biasing member can normally urge the check ball assembly away from the check valve seat.

According to other features, when a predetermined threshold pressure is experienced into the safety valve first port, the check ball assembly can be urged toward the check valve seat against the bias of the check valve biasing member. The check ball assembly can include a first check ball and a second check ball. The first and second check balls can be formed of one of (i) plastic and (ii) synthetic rubber and fluoropolymer.

The main valve further comprises a solenoid, an armature and a poppet. The armature can be associated with the solenoid and be configured to energize and translate the armature in a direction along its longitudinal axis. The poppet can have an opening. The poppet can be retained at a distal end portion of the armature. The poppet can be retained at the distal end portion of the armature by a retaining ring. An annular space can be defined between the distal end portion of the armature and the opening. The pressure can escape through the opening during a first stage of the two-stage operation. A first o-ring can be positioned between the poppet and the valve body on a valve seat at the main valve second port. The poppet can be configured to be held down against the first o-ring and the valve seat from pressure in the fuel tank.

According to other features, a second o-ring can be disposed around the distal end of the armature and configured to selectively move against the poppet and close the annular space when the solenoid is de-energized. The second o-ring can be configured to move away from the poppet when the solenoid is energized during the first stage of the two-stage operation. The armature can pull the poppet off of the seat during a second stage of the two-stage operation when a threshold amount of pressure drop has occurred through the annular space during the first stage.

BRIEF DESCRIPTION OF THE DRAWINGS

The present disclosure will become more fully understood from the detailed description and the accompanying drawings, wherein.

DETAILED DESCRIPTION

Figure 1:
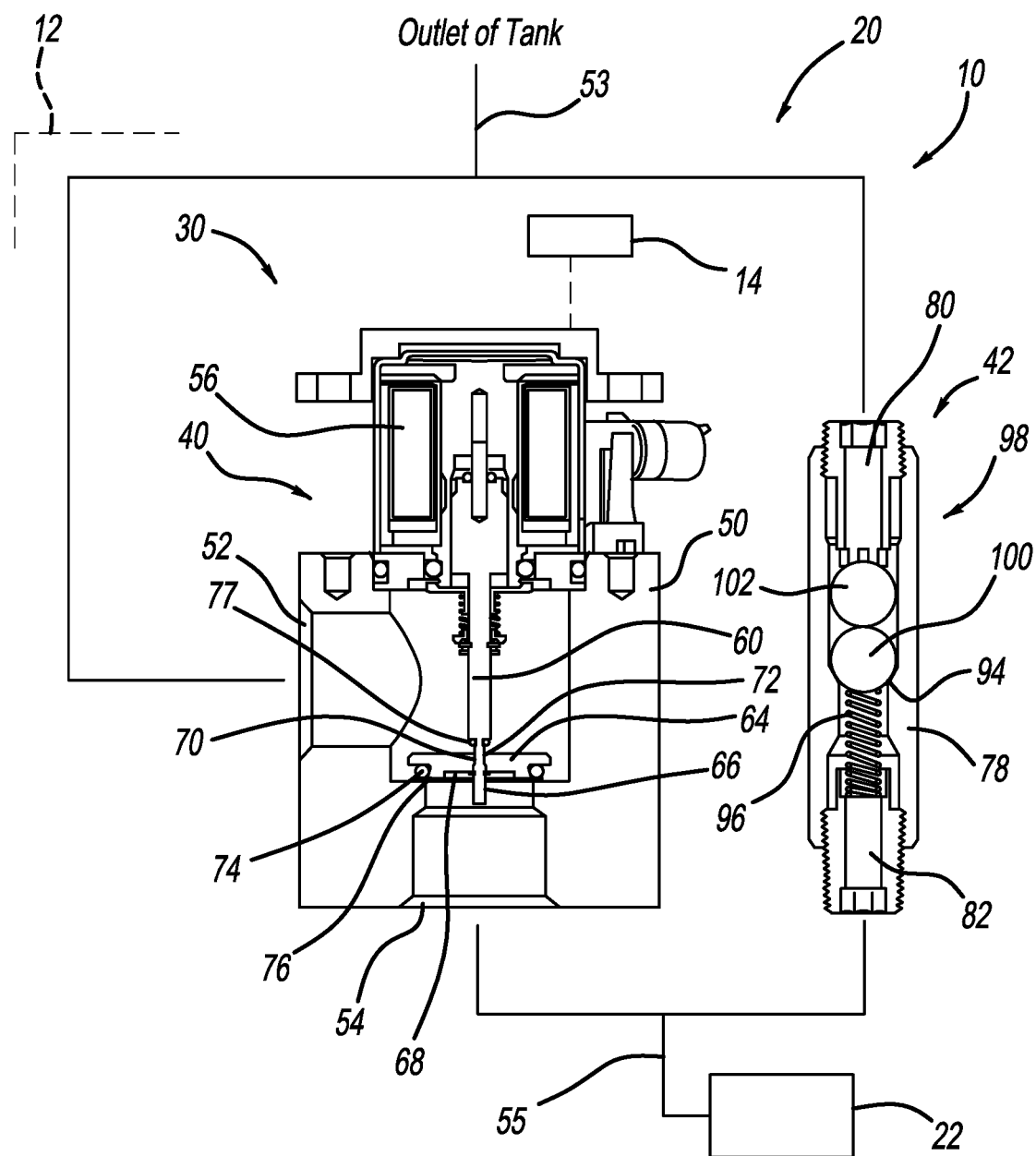
FIG. 1 is a schematic illustration of a fuel tank system having an evaporative emissions control system including a valve assembly including a main valve and a safety check valve constructed in accordance to one example of the present disclosure.
Figure 2:
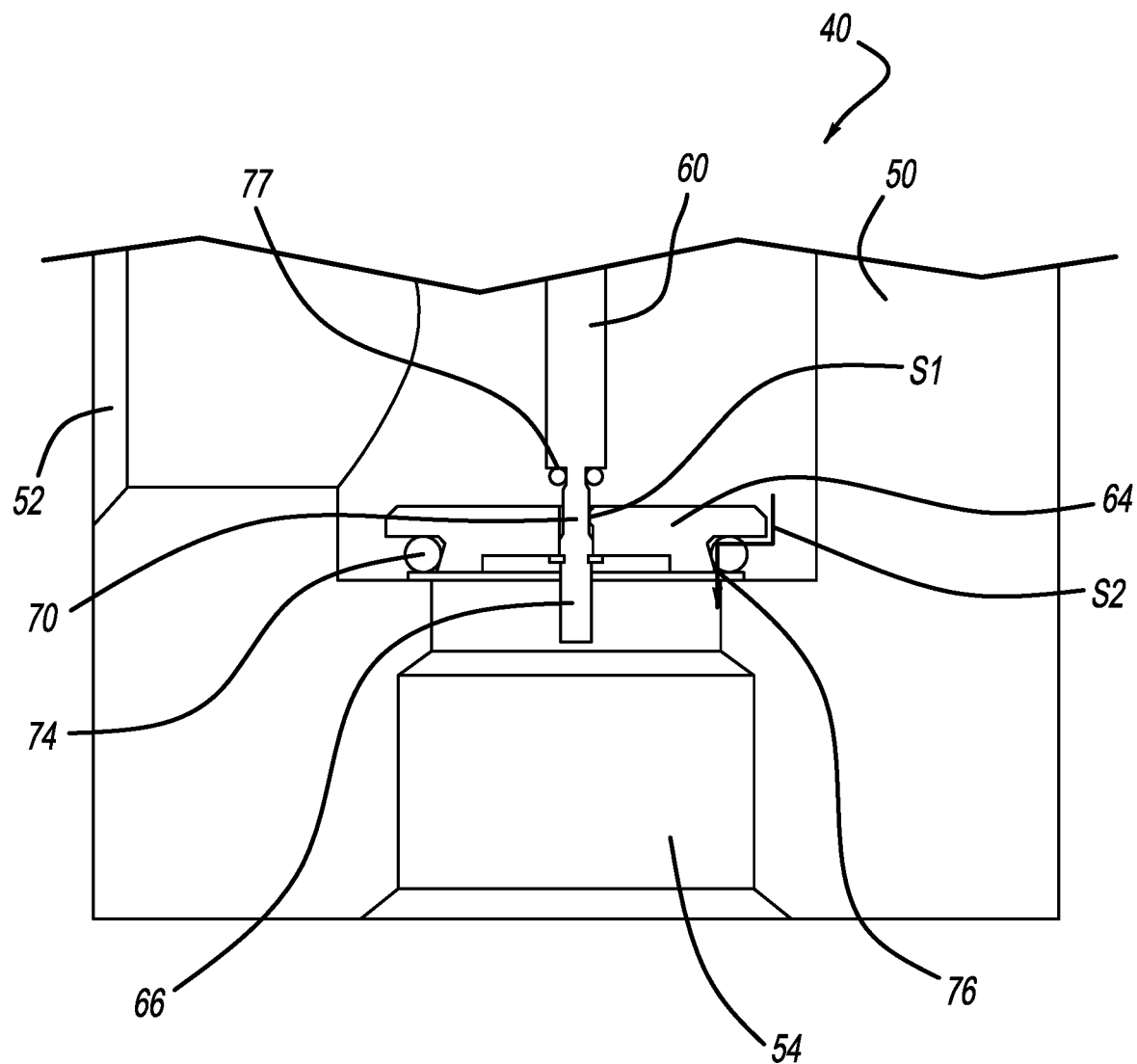
FIG. 2 is a close-up view of the main valve of FIG. 1 according to one example of the present disclosure and identifying a first stage opening and a second stage opening.

With initial reference to FIGS. 1-5, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump (not specifically shown). A controller 14 can be configured to regulate the operation of the engine and its fuel delivery system. The fuel tank 12 is operatively connected to an evaporative emissions control system 20 that includes a purge canister 22 adapted to collect fuel vapor emitted by the fuel tank 12 and to subsequently release the fuel vapor to the engine. The controller 14 can also be configured to regulate the operation of evaporative emissions control system 20 in order to recapture and recycle the emitted fuel vapor. The fuel tank system 10 can be incorporated on traditional fuel tanks and on fuel tanks configured for use on hybrid electric vehicles.

The evaporative emissions control system 20 includes a valve assembly 30. The controller 14 can be adapted to regulate the operation of a valve assembly 30 to selectively open and close the valve, in order to provide over-pressure and vacuum relief for the fuel tank 12. The valve assembly 30 can be configured to control a flow of fuel vapor between the fuel tank 12 and the purge canister 22. The valve assembly 30 includes a main valve 40 and a safety check valve 42. While the main valve 40 and the safety check valve 42 are shown as distinct components in FIG. 1, they may be provided in a single valve assembly. The main valve 40 is operated during refueling. The safety check valve 42 is incorporated to handle venting flow. The safety check valve 42 is normally open and configured to check or close when a flow or pressure drop exceeds a threshold.

The main valve 40 generally include a valve body 50 having a first port 52 that is fluidly connected to a fuel tank outlet 53 of the fuel tank 12 and a second port 54 that is fluidly connected to a valve assembly outlet 55 of the valve assembly 30. The valve assembly outlet 55 can be fluidly connected to the canister 22 and in some examples a filler neck of the fuel tank 12. The main valve 40 further includes a solenoid 56 that can energize to translate an armature 60 in a direction generally along its longitudinal axis. A poppet 64 is retained at a distal end portion 66 of the armature 60 by a retaining ring 68. Specifically, the distal end 66 of the armature 60 extends through an opening 70 defined through the poppet 64. Lash exists between the distal end 66 of the armature 60 and the poppet 64. An annular space 72 is defined between the distal end portion 66 of the armature 60 and the opening 70 of the poppet 64. An o-ring 74 is positioned between the poppet 64 and the valve body 50 on a valve seat 76 at the second port 52. The poppet 64 is held down on the valve seat 76 from pressure in the fuel tank 12.

As will be described herein, the main valve 40 is configured to open in two stages. When the main valve 40 is de-energized, the armature 60 is pushed down (toward the second port 54). An armature o-ring 77 is in contact with the poppet 64 closing the annular space 72. As the annular space 72 is sealed and the seat 76 is sealed, no leakage exists through second port 54. When a refueling event exists, the main valve 40 is energized. The poppet 64 is still held down against the o-ring 74 at the seat 76 because of the pressure experienced in the fuel tank 12. When the main valve 40 is energized, the armature 60 is pulled upward (away from the second opening 54) causing the armature o-ring 77 to move away from the poppet 64 permitting vapor to slowly escape (or bleed) through the annular space 72. In one example, grooves are defined on the distal end portion 66 of the armature 60 to further facilitate the bleeding of pressure. Pressure is slowly dropped upstream of the main valve 40. When the pressure (upstream of the main valve 40) decreases to a predetermined level, the armature 60 is permitted to pull further upward lifting the poppet 64 off the seat 76 (second stage). Again, the retaining ring 68 allows the armature 60 to lift the poppet 64 off of the seat 76.

As a result, the main valve 40 offers a two-stage opening feature. A first stage occurs when flow is permitted through a first stage opening S1 at the annular space 72. A second stage occurs when flow is permitted through a second stage opening S2 when the poppet 64 is lifted off of the seat 74. A rapid depressurization is allowed between the fuel tank 12 and the downstream canister 22. By way of example only, the annular space 72 is capable of depressurizing about 100 Liters at 35 kPa in about 1 minute. The poppet 64 will lift off of the seat 74 at about 13 kPa. The fuel tank 12 completes depressurization rapidly afterward.

The safety check valve 42 has a check valve body 78. The safety check valve 42 has a first port 80 and a second port 82. The fuel tank outlet 53 can collectively comprise the first port 52 of the main valve 40 and the first port 80 of the safety check valve 42. The valve assembly outlet 55 can collectively comprise the second port 54 of the main valve 40 and the second port 82 of the safety check valve 42.

Figure 3:
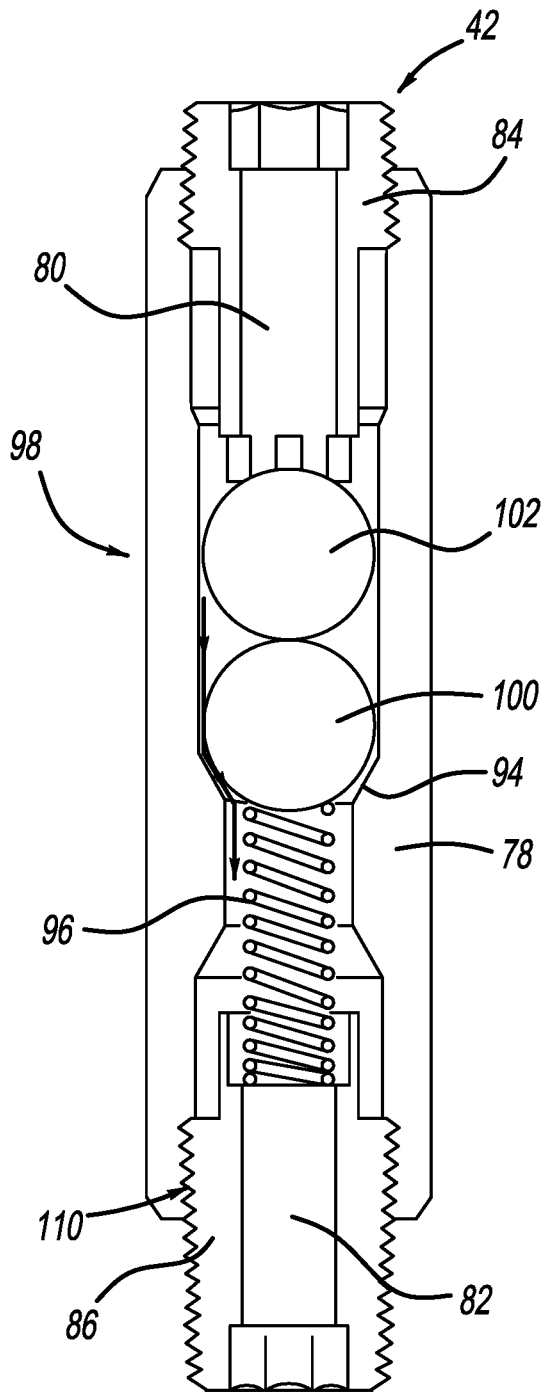
FIG. 3 is a sectional view of the safety check valve of FIG. 1 and shown in a normally open position according to one example of the present disclosure.
Figure 4:
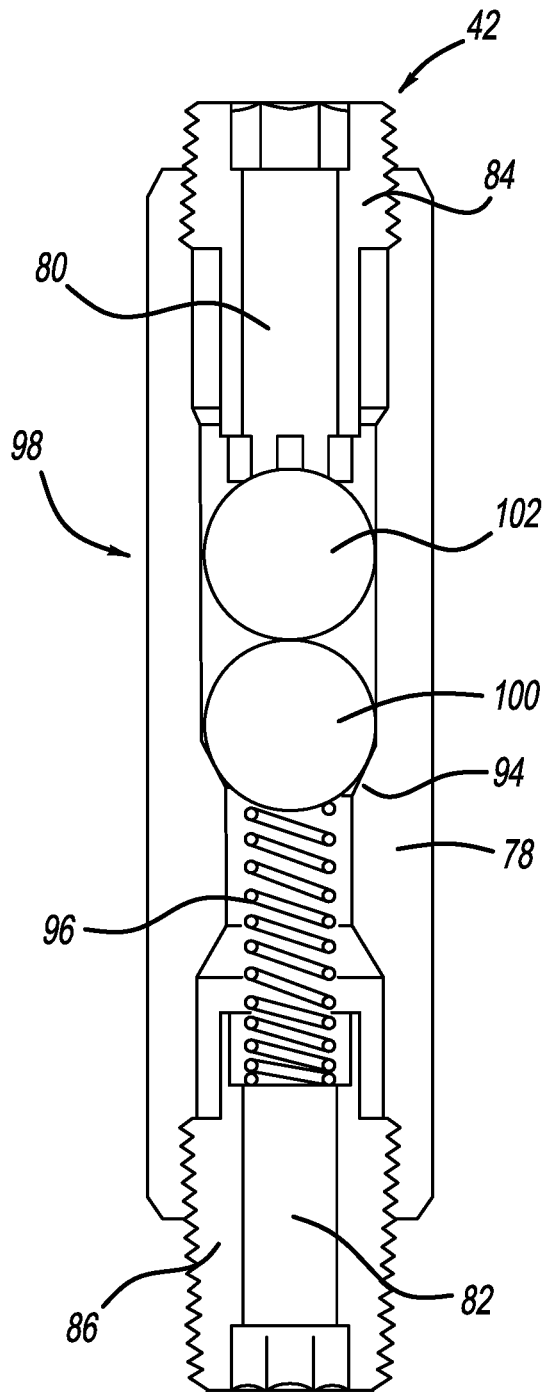
FIG. 4 is a sectional view of the safety check valve of FIG. 1 and shown in a closed position.
Figure 5:
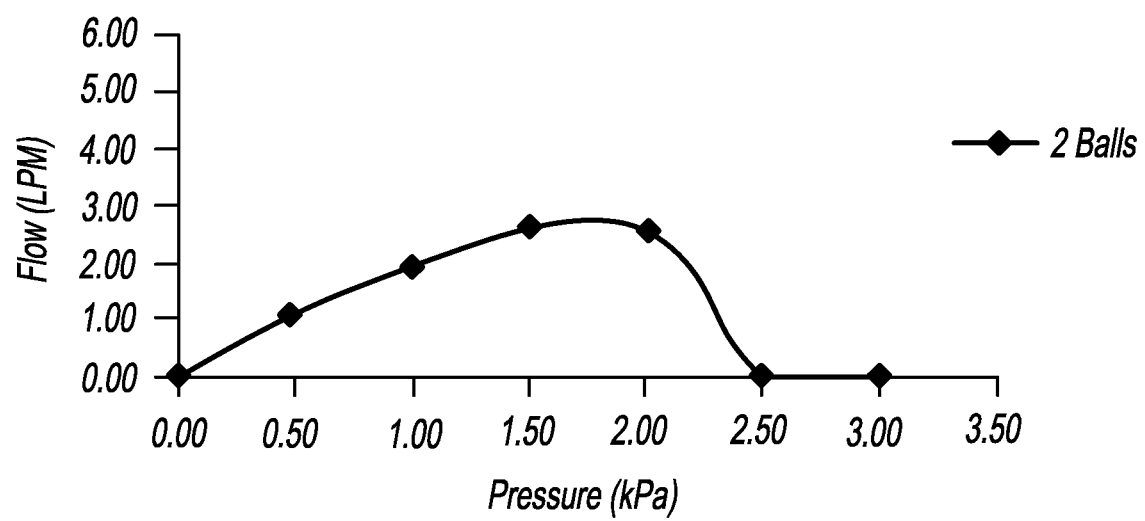
FIG. 5 is a plot of flow rate and pressure experienced at the safety check valve according to one configuration of the present disclosure.

In the example shown, the first port 80 is provided through an upstream plug 84 and the second port 82 is provided through a downstream plug 86. The check valve body 78 has a check valve seat 94. A check valve biasing member 96 urges a check ball assembly 98 including a first and a second check ball 100, 102 away from the seat 94 in a normally open position (FIG. 3). In the normally open position vapor flow is permitted between the check ball 100 and the valve seat 94. When a predetermined threshold pressure is experienced into the first port 80, the check ball assembly 98 is urged toward the seat 94 against the bias of the biasing member 96 and the first check ball 100 sealingly engages the seat 94 (FIG. 4). The safety check valve 42 provides a mechanically actuated valve. The safety check valve 42 will close when the difference of the pressure in the fuel tank 12 and the pressure of venting system outside of the fuel tank 12 (to the canister 22) of the evaporative emissions control system 20 is higher than a closing pressure of the safety check valve 42. The venting path from the fuel tank 12 to the venting system outside of the fuel tank 12 is closed. In one example, the check balls 100 and 102 may be formed of plastic. In another example, the check balls 100 and 102 may be formed of synthetic rubber and fluoropolymer elastomer such as Viton manufactured by DuPont.

The safety check valve 42 provides a safety function by inhibiting high pressures from passing from the first port 82 to the second port 84. Explained further, if there is a large pressure experienced in the fuel tank 12, the safety check valve 42 moves to the closed position (check ball 100 ultimately moves against the seat 94, see FIG. 4) to inhibit flow out of the second port 82. The safety check valve 42 will seal off any vapor from escaping through the second port 82. In one configuration, the check ball assembly 98 can be urged closed around 3 liters per minute (see also FIG. 4).

The safety check valve 42 can further allow adjustment of preload of the spring 96. A threaded connection 110 is provided between the check valve body 78 and the downstream plug 86. The downstream plug 86 can be adjusted relative to the check valve body 78 to alter the preload of the spring 96. In this regard, the safety check valve 42 can be adjusted to accommodate different opening pressures for different vehicle applications. It is appreciated however that the threaded connection 110 may alternatively be a fixed connection.

With particular reference to FIG. 4, the safety check valve 42 can be configured to close at around 2.5 kPa at flow rates between 2 and 5 liters per minute (LPM). As can be appreciated, the pressure can be adjusted such as by modifying the spring rate of the check valve biasing member 86.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel tank system comprising:
   a fuel tank having a fuel tank outlet;
   a purge canister;
   a valve assembly that is fluidly coupled between the fuel tank and the purge canister, the valve assembly including:
      a main valve configured to move from a closed position to an open position, the main valve having a main valve first port fluidly coupled to the outlet of the fuel tank and a main valve second port fluidly connected to the purge canister; and
      a safety check valve that is configured to move from an open position to a closed position upon a pressure drop at the fuel tank outlet exceeding a predetermined threshold, the safety check valve having a safety check valve first port fluidly coupled to the outlet of the fuel tank and a safety check valve second port fluidly coupled to the purge canister, the safety check valve comprising:
         a check valve body including the check valve first port, the check valve second port and a check valve seat;
         a check ball assembly including a first check ball and a second check ball; and
         a check valve biasing member that normally urges the check ball assembly away from the check valve seat, when a predetermined threshold pressure is experienced into the safety valve first port, the check ball assembly is urged toward the check valve seat against the bias of the check valve biasing member.

2. The fuel tank system of claim 1 wherein the main valve second port and the safety valve second port collectively comprise a valve assembly outlet that is fluidly connected to the purge canister.

3. The fuel tank system of claim 1 wherein the first and second check balls are formed of one of (i) plastic and (ii) synthetic rubber and fluoropolymer.

4. The fuel tank system of claim 2 wherein the main valve is configured to move from a closed position to an open position during a two-stage operation, wherein the main valve further comprises:
   a solenoid;
   an armature associated with the solenoid, wherein the solenoid is configured to energize and translate the armature in a direction along its longitudinal axis; and
   a poppet having an opening, the poppet retained at a distal end portion of the armature.

5. The fuel tank system of claim 4 wherein the poppet is retained at the distal end portion of the armature by a retaining ring.

6. The fuel tank system of claim 5 wherein an annular space is defined between the distal end portion of the armature and the opening, wherein pressure escapes through the opening during a first stage of the two-stage operation.

7. The fuel tank system of claim 6, further comprising a first o-ring positioned between the poppet and the valve body on a valve seat at the main valve second port.

8. The fuel tank system of claim 7 wherein the poppet is configured to be held down against the first o-ring and the valve seat from pressure in the fuel tank.

9. The fuel tank system of claim 8, further comprising a second o-ring disposed around the distal end of the armature and configured to selectively move against the poppet and close the annular space when the solenoid is de-energized.

10. The fuel tank system of claim 9 wherein the second o-ring is configured to move away from the poppet when the solenoid is energized during the first stage of the two-stage operation.

11. The fuel tank system of claim 10 wherein the armature pulls the poppet off of the seat during a second stage of the two-stage operation when a threshold amount of pressure drop has occurred through the annular space during the first stage.

12. A fuel tank system comprising:
a fuel tank having a fuel tank outlet;
a purge canister;
a valve assembly that is fluidly coupled between the fuel tank and the purge canister, the valve assembly including:
a main valve configured to move from a closed position to an open position during a two-stage operation, the main valve having a main valve first port fluidly coupled to an outlet of the fuel tank and a main valve second port fluidly connected to the purge canister; and
a safety check valve that is configured to move from an open position to a closed position upon a pressure drop at the fuel tank outlet exceeding a predetermined threshold, the safety check valve having:
a safety check valve first port fluidly coupled to the outlet of the fuel tank;
a safety check valve second port fluidly coupled to the purge canister;
a check ball assembly; and
a check valve biasing member that normally urges the check ball assembly away from a check valve seat.

13. The fuel tank system of claim 12 wherein when a predetermined threshold pressure is experienced into the safety valve first port, the check ball assembly is urged toward the check valve seat against the bias of the check valve biasing member.

14. The fuel tank system of claim 13 wherein the check ball assembly comprises a first check ball and a second check ball.

15. The fuel tank system of claim 14 wherein the first and second check balls are formed of one of (i) plastic and (ii) synthetic rubber and fluoropolymer.

16. The fuel tank system of claim 12 wherein the main valve further comprises:
a solenoid;
an armature associated with the solenoid, wherein the solenoid is configured to energize and translate the armature in a direction along its longitudinal axis; and
a poppet having an opening, the poppet retained at a distal end portion of the armature.

17. The fuel tank system of claim 16 wherein the poppet is retained at the distal end portion of the armature by a retaining ring.

18. The fuel tank system of claim 17 wherein an annular space is defined between the distal end portion of the armature and the opening, wherein pressure escapes through the opening during a first stage of the two-stage operation.

19. The fuel tank system of claim 18, further comprising a first o-ring positioned between the poppet and the valve body on a valve seat at the second port.

20. The fuel tank system of claim 19 wherein the poppet is configured to be held down against the first o-ring and the valve seat from pressure in the fuel tank.

21. The fuel tank system of claim 20, further comprising a second o-ring disposed around the distal end of the armature and configured to selectively move against the poppet and close the annular space when the solenoid is de-energized.

22. The fuel tank system of claim 21 wherein the second o-ring is configured to move away from the poppet when the solenoid is energized during the first stage of the two-stage operation.

23. The fuel tank system of claim 22 wherein the armature pulls the poppet off of the seat during a second stage of the two-stage operation when a threshold amount of pressure drop has occurred through the annular space during the first stage.

24. A fuel tank system comprising:
a fuel tank having a fuel tank outlet;
a purge canister;
a valve assembly that is fluidly coupled between the fuel tank and the purge canister, the valve assembly including:
a main valve configured to move from a closed position to an open position, the main valve having a main valve first port fluidly coupled to the outlet of the fuel tank and a main valve second port fluidly connected to the purge canister, wherein the main valve is configured to move from a closed position to an open position during a two-stage operation, wherein the main valve further comprises:
a solenoid;
an armature associated with the solenoid, wherein the solenoid is configured to energize and translate the armature in a direction along its longitudinal axis; and
a poppet having an opening, the poppet retained at a distal end portion of the armature; and
a safety check valve that is configured to move from an open position to a closed position upon a pressure drop at the fuel tank outlet exceeding a predetermined threshold, the safety check valve having a safety check valve first port fluidly coupled to the outlet of the fuel tank and a safety check valve second port fluidly coupled to the purge canister;
wherein the main valve second port and the safety valve second port collectively comprise a valve assembly outlet that is fluidly connected to the purge canister.

* * * * *